Figure 1:
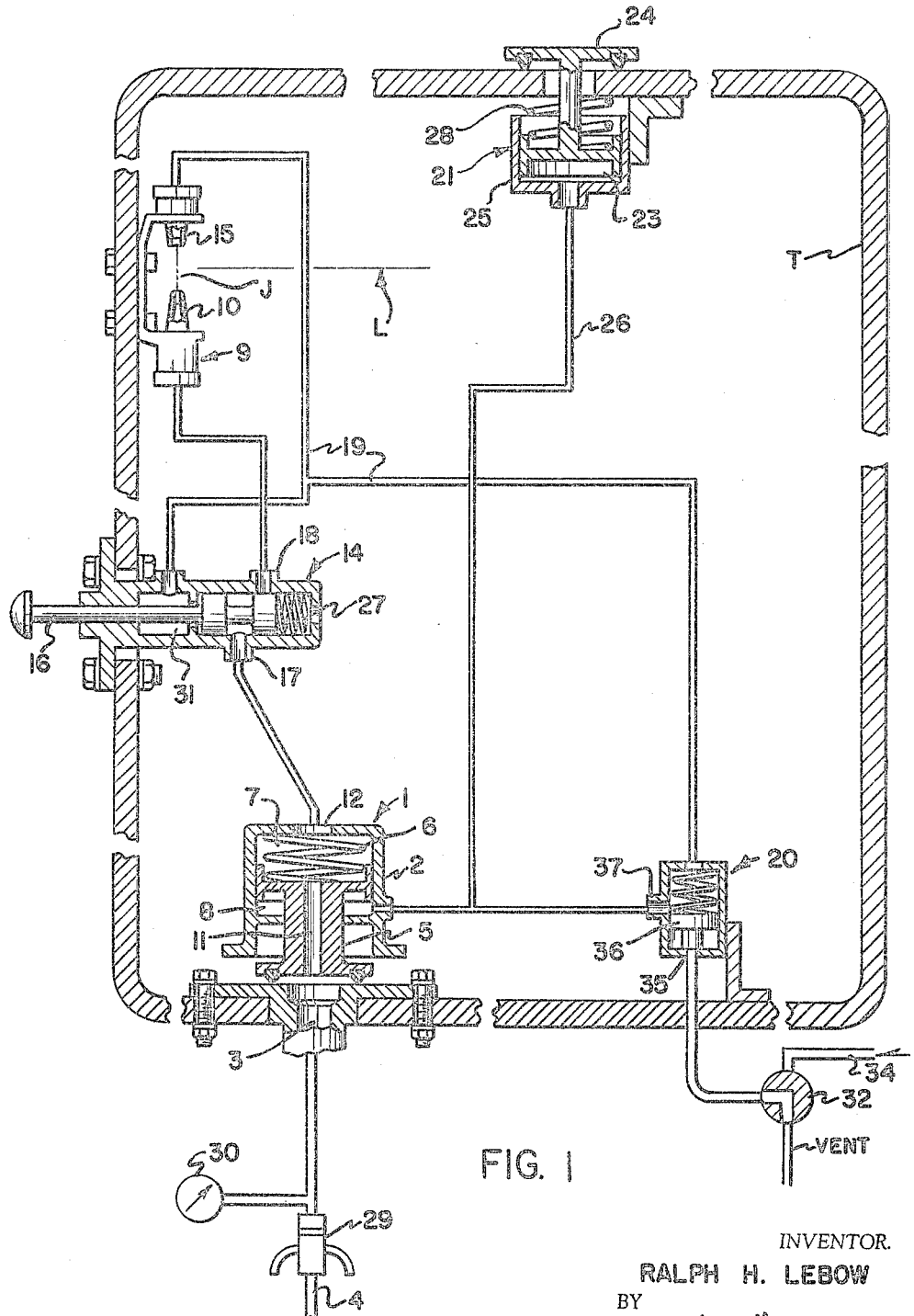

INVENTOR.
RALPH H. LEBOW
BY
John N. Wolfram
ATTORNEY

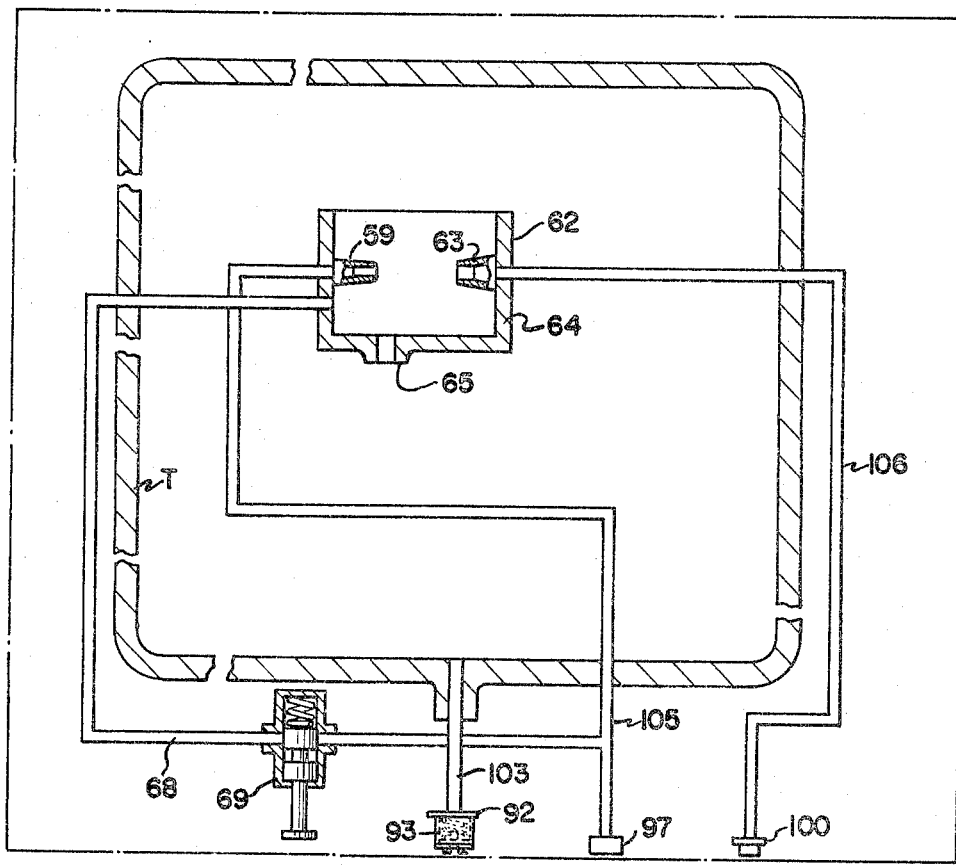
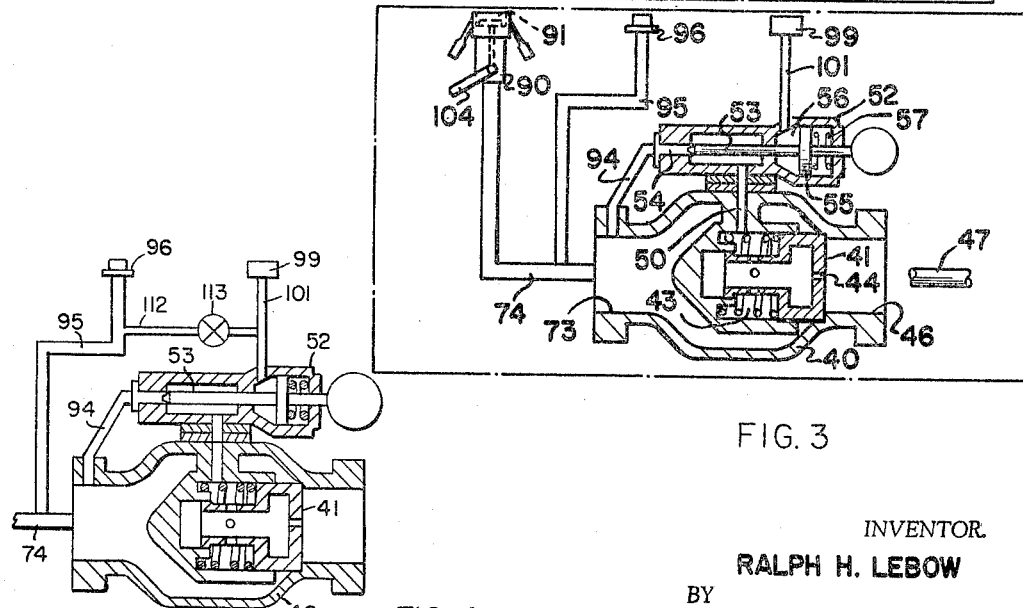
FIG. 3
FIG. 4
INVENTOR.
RALPH H. LEBOW
BY
John N. Wolfram
ATTORNEY

United States Patent Office 3,269,404
Patented August 30, 1966

3,269,404
AUTOMATIC SHUTOFF VALVE
Ralph H. Lebow, Pacific Palisades, Calif., assignor to Parker-Hannifin Corporation, Cleveland, Ohio, a corporation of Ohio
Filed Dec. 3, 1962, Ser. No. 241,613
17 Claims. (Cl. 137—199)

The present invention relates generally as indicated to an automatic shutoff valve, and more particularly, to a level control valve which is operative automatically to shut off the flow of liquid into a tank or the like in response to filling of the tank to a predetermined level. The invention has been particularly developed in connection with the filling of tank trucks but obviously is adaptable for use in various other instances in which the filling of a tank to a predetermined level is to be automatically controlled.

It is a principal object of this invention to provide an automatic shutoff valve in which the pressure head derived from the velocity head of a liquid jet causes the valve to be maintained in open position until the jet energy is dissipated by submergence in the rising level of liquid flowing into the tank, such submergence resulting in substantial loss of pressure energy and consequent closing of the valve and discontinuance of the tank filling operation.

It is another object of this invention to provide an automatic shutoff valve of the character indicated which has associated therewith a precheck valve which may be manually operated to make sure that the automatic shutoff valve, the jet system, and other appurtenances are in operative condition so that the tank filling operation may be commenced with assurance that all components of the system are in proper operating condition.

It is another object of this invention to provide an automatic shutoff valve of the character indicated which has associated therewith means which, when operated, simulates filling of the tank to check proper operation of the level sensing device.

It is another object to provide a jet system for holding open the pilot valve of a main system being controlled by the pilot valve whereupon closure of the pilot valve cuts off the supply to the jet whereby no fluid will flow into the tank when the pilot valve is closed.

It is another object of this invention to provide an automatic shutoff valve of the character indicated which, when installed at the bottom of a tank, has associated therewith means for opening the same for draining liquid out of the tank.

It is another object of this invention to provide an automatic shutoff valve of the character indicated, which has associated therewith a vent valve which is automatically opened whenever the automatic shutoff valve is opened, either for filling or draining of the tank.

It is another object to provide a main valve controlled by a manually opened pilot valve in which energy from a liquid jet is utilized for holding the pilot valve in open position until the jet energy is dissipated.

It is another object to provide a pilot valve controlled tank filling main valve in which the pilot valve also controls flow of fluid to a jet system for holding the pilot valve open until the tank has been filled, and in which there is a back pressure valve for assuring sufficient pressure in the jet system for keeping the pilot valve open until the tank has been filled.

It is another object to provide a jet controlled tank filling system of the type described in which a back pressure valve is utilized for assuring sufficient pressure in the jet system for proper operation of the same, flow to both the jet system and back pressure valve being controlled by a manually opened pilot valve which controls the tank filling valve.

It is another object to provide a jet controlled main valve in which a pilot valve for the main valve is manually operable for initiating flow through the main valve and the jet system and in which the jet system maintains the pilot valve open until the tank has been filled to a predetermined level and in which the pilot valve may be manually closed for stopping flow into the tank at any time.

It is another object to provide a means for filling a tank truck from a stationary supply system in which a fluid pressure operated main valve in the stationary supply system may be detachably connected to a jet system in the tank truck for causing the main valve to automatically close when the tank truck has been filled to a predetermined level.

It is another object to provide a tank filling system which automatically shuts off when the tank is filled to a predetermined level, there being at least one form disclosed in which there are no moving parts within the tank, whereby all movable parts are on the exterior of the tank for ready accessibility for servicing.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, this being indicative, however, of but several of the various ways in which the principle of the invention may be employed.

FIGS. 1 to 4 depict schematically several embodiments of the present invention.

Referring to FIG. 1, the reference character T represents a tank or receptacle which it is desired to fill with liquid to a predetermined level L.

In the present case the tank T has a main inlet valve 1 mounted in the bottom thereof, said inlet valve 1 comprising a housing 2 having an inlet passage 3 through which the liquid under pressure is introduced into the tank T from a suitable supply line 4. The inlet passage 3 is opened and closed by movable valve member 5 which is biased by spring 6 to closed position. As evident, the valve member 5 will be held in passage closing position when the fluid pressure in the inlet passage 3 and in the chamber 7 is the same provided that there is a low pressure in chamber 8.

Mounted in the tank T at the desired level to which it is desired to fill the same is a level sensing device 9 which herein is shown as comprising a jet nozzle 10 which is in fluid communication with the pressure inlet passage 3 via the passage 11 through the valve member 5, the port 12 of chamber 7, and the normally closed manually operable pilot or start-up valve 14 which may be mounted in any convenient place on the tank T, or in association with the main inlet valve 1; and a jet receiver 15 spaced from and aligned with the nozzle 10 upon which a jet of liquid emerging from the nozzle 10 impinges when pilot valve 14 is opened and when fluid under pressure is introduced into the inlet passage 3.

When the level of the liquid in the tank T is below the jet J emerging from the nozzle 10, the receiver circuit will transform the velocity head of the jet J to a fluid pressure head which acts on the plunger 16 of pilot valve 14 to hold it in position maintaining open communication between the ports 17 and 18 thereof. Such pressure head will also be transmitted through the conduit 19 and shuttle valve 20 into the chamber 8 of the main inlet valve 1. Accordingly, the inlet valve member 5 will be moved to open position permitting flow of liquid into the tank T. There is also mounted at the top of the tank a vent valve 21 which is spring-biased to closed position and which is automatically opened by such pressure head acting in the chamber 23 between the vent valve member 24 and the vent valve housing 25 through the conduit 26.

It can be seen from the foregoing that the tank filling operation will continue until the level of the liquid in the tank rises above the nozzle 10. At that time the velocity head of the jet J will be substantially lessened, or dissipated, whereupon the pressure head in the jet receiver circuit will decrease to an extent such that return spring 27 shifts pilot valve plunger 16 to a position closing communication between the ports 17 and 18 whereby the jet J is stopped altogether. As a result, pressure builds up in the main valve housing chamber 7 and this in conjunction with the decreased pressure in the opposite chamber 8 causes the main inlet valve member 5 to be forced to closed position with the help of the spring 6. Thus, even though the pressure of the liquid is maintained in the inlet passage 3, the inlet valve member 5 will remain closed.

Furthermore, when the pressure head is decreased, or lost, as aforesaid, in the chamber 23 the vent valve member spring 28 will pull the vent valve member 24 to closed position.

Pilot valve 14 may also be manually actuated to closed position for cuting off flow to jet nozzle 10 for emergency closing of main valve 1 at any time. Pilot valve 14 also may be used to precheck the operability of the automatic shutoff valve assembly when it is contemplated to fill the tank. To do so, filling nozzle 29 is connected to the inlet circuit and when it is opened pressure gauge 30 in the inlet passage 3 will register pump pressure. Now, when pilot valve plunger 16 is manually actuated to open communication of the inlet passage 3 with the jet nozzle 10, the resulting jet J in impinging on the receiver 15, should build up sufficient pressure in the chambers 31 and 23 of valve 14, the main inlet valve 1, and the vent valve 21, respectively, sufficient to maintain valve plunger 16 in its manually actuated open postiion, and to effect opening movement of the main inlet valve member 5 and the vent valve member 24. To precheck the closing operation of valve member 5, the operator manually pulls plunger 16 to closed position, whereup both the vent valve 21 and main inlet valve 1 should close as will be indicated by gauge 30 by the build-up of pressure in the inlet passage 3 to original pump pressure.

Another feature of this invention is that the main inlet valve 5 may be opened at any time for draining the liquid from the tank T, this being effected by actuating the three-way valve 32 from its vent position as shown, to a position where in an air pressure supply line 34 is communicated with the port 35 of the shuttle valve 20, whereupon the plunger 36 thereof is moved past the port 37 so that such air pressure reaches the chambers 8 and 23 of the main inlet valve 1 and the vent valve 21 respectively, to open them, whereupon the liquid in the tank T may be drained therefrom. For such draining operation, the liquid supply nozzle 29 will, of course, be disconnected and a drain coupling will be connected to receive the fluid from the tank T.

Figure 2:
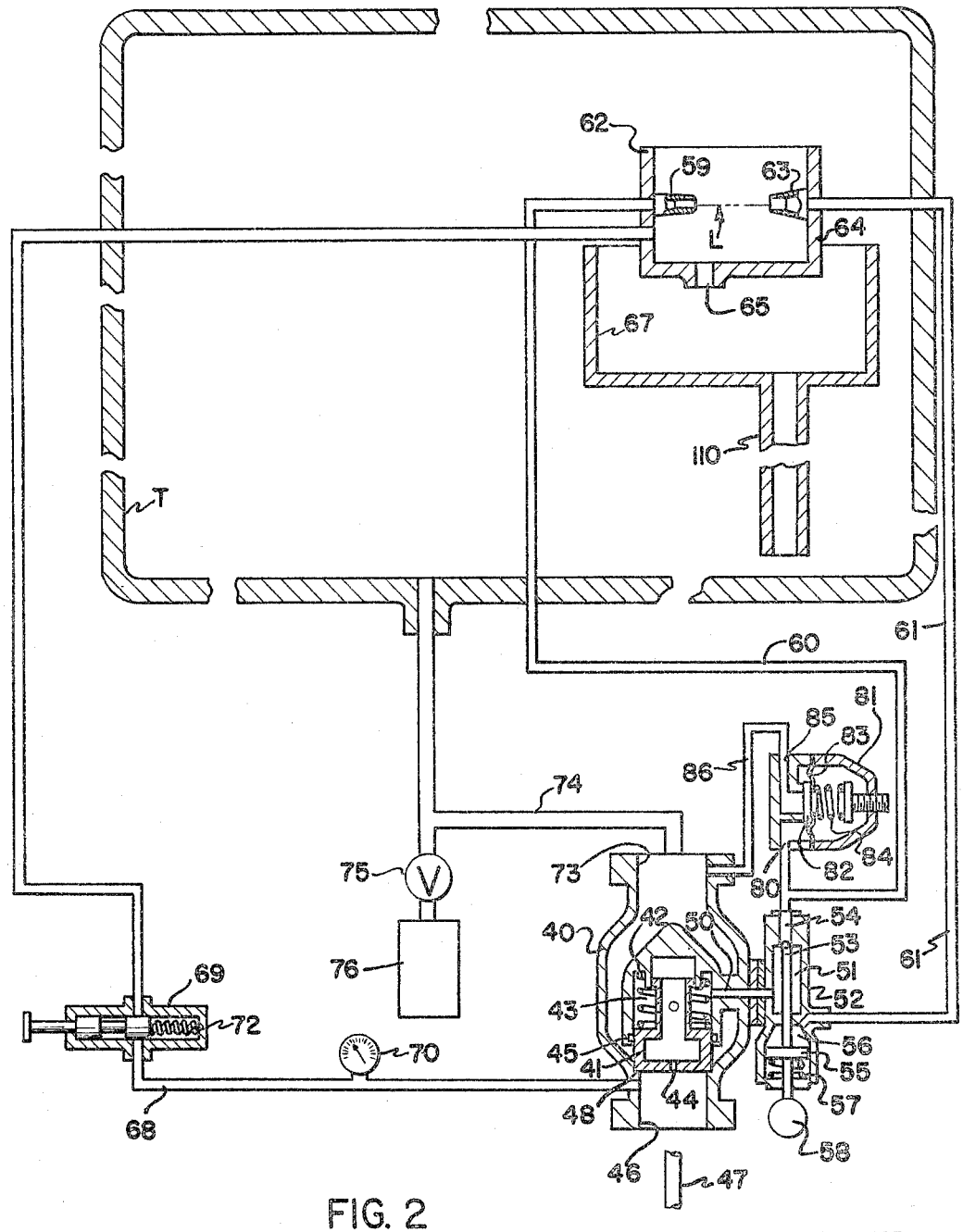

Referring to FIG. 2, the reference character T again represents a tank which it is desired to fill with liquid to a predetermined level L and in lieu of mounting an automatic shutoff assembly 1 in the tank T, as contemplated in FIG. 1, a separate automatic shutoff valve assembly 40 is provided which has therein a main inlet valve member 41, a spring 42, and a pressure chamber 43. Valve member 41 has a restricted orifice 44 and is sealed with respect to chamber 43 by packing 45, packing 45 defining an area on valve member 41 which is exposed to pressure of fluid in chamber 43 and which area is larger than the area of the lower side of valve member 41 exposed to pressure of fluid in inlet port 46 when the valve member is closed against valve seat 48. Inlet port 46 is connected to a fuel supply pipe 47. A passage 50 connects chamber 43 with chamber 51 of pilot valve 52. The latter has a valve stem 53 for opening and closing passage 54. A piston 55 is formed on the other end of the valve stem to define a chamber 56. A spring 57 normally keeps valve stem 53 in a position for closing passage 54. A knob 58 is attached to the valve stem for manual actuation.

Passage 54 connects with jet nozzle 59 of jet assembly 62 by means of a pipe line 60. Another pipe line 61 connects chamber 56 with a jet receiver 63. Jet assembly 62 is mounted with tank T.

Surrounding jet assembly 62 is a relatively small size container or receptacle 64, open at the top and having a drain opening 65 in the bottom thereof and, if desired, there can also be a drain collector 67. Leading from valve inlet 46 is conduit 68 which is connected at its upper end to container 64 via a normally closed manual precheck valve 69. Conduit 68 also has therein a gauge 70, if desired. Leading from outlet port 73 of valve 40 is a pipe 74 which connects with tank T and also with a drain valve 75 connected to a conduit 76.

Drain valve 75 is normally closed, but if it is desired to drain or unload the tank T this valve 75 is opened for flow of fluid out of the tank T at the rate of 600 gal./min., for example. It has been found that with the ordinary available pressure in the supply line 47 a relatively small automatic shutoff valve 40 is adequate, such as 3″ or 4″ size, whereas, for unloading the tank T it may be desired to have valve 75 of 6″ size for rapid emptying.

Passage 54 also connects with an inlet port 80 in back pressure valve 81, the latter having a valve member 82 attached to diaphragm 83 and seated by spring 84. Outlet port 85 of valve 81 is connected by line 86 to the downstream side of valve 40.

To fill tank T with the arrangement of FIG. 2, the operator pulls valve stem 53 by means of knob 58 to open passage 54.

Pipe line 60 and jet nozzle 59 are not of sufficient flow capacity to permit fluid from chamber 43 to flow faster therethrough than it may enter the chamber through orifice 44 and therefore valve 41 stays closed for a small fraction of a second until pressure of fluid in port 80 reaches the predetermined opening pressure for which valve member 82 has been set, which for example, in a 200 gallon perminute system may be on the order of 15 p.s.i.

With valves 53 and 82 open fluid may flow through jet 59 and valve 82 faster than it may enter through orifice 44, such fluid passing through passages 54 and line 60 to jet nozzle 59 where it forms a jet stream which is received by jet receiver 63 to develop a pressure head in line 61 and chamber 56 for applying pressure to the upper side of piston 55 and thus hold valve 53 open against spring 57 despite release of knob 58 by the operator. The consequent drop of pressure in chamber 43 permits pressure in inlet 46 to open valve member 41 and fuel will be supplied to the tank through line 74. As the level of fuel rises in tank T it will enter receptacle 64 through port 65. When it reaches the level indicated at L, the jet stream will be submerged so that it can no longer sufficiently pressurize line 61 and chamber 56 to overcome spring 57 and the latter will move valve stem 53 for closing off port 54. Pressure will then build up in chamber 43 through orifice 44 and cause valve member 41 to close and thus further filling of tank T is discontinued.

It is also evident that valve 53 may be closed manually at any time for discontinuing filling of the tank at the will of the operator.

When valve member 41 is open and the tank is being filled, the pressure drop between valve inlet 46 and the interior of the tank may not be enough so that there will be sufficient pressure in inlet 46 for developing enough pressure in the jet circuit for keeping valve 53 open. Thus at 200 g.p.m. flow the pressure drop referred to may develop only 8 p.s.i. at inlet port 46 whereas a minimum of 10 p.s.i. may be required at this point for sufficiently pressurizing the receiver circuit for maintaining valve 53 open.

Back pressure valve 81 assures that there will enough pressure in the jet circuit to hold valve 53 open by causing valve 41 to remain closed until the required pressure has been developed. Thus, spring 84 may be adjusted so that valve member 82 will open at 15 p.s.i., thus assuring that the pressure chamber 43 will be approximately the same before valve member 41 opens. The pressure in inlet port 46 will thus be correspondingly higher, or approximately 23 p.s.i. and there will then be sufficient pressure in the jet circuit for maintaining valve 53 open.

When it is desired to check operability of the system before the tank is full to be sure that filling of the tank will automatically discontinue when the tank is filled to the proper level, valve 53 is pulled down to cause opening of main inlet valve member 41 to start the jet stream flow from nozzle 59 to receiver 63, as previously described. Thereafter, precheck valve 69 is manually opened by pushing the valve member inwardly to allow liquid under pressure to flow through conduit 68 into the receptacle 64 to fill it to thus submerge the jet stream to decrease the pressure head in the receiver circuit 61. To permit such filling of container 64, drain opening 65 is of less flow capacity than conduit 68 under the prevailing conditions so that fluid will enter container 64 through conduit 68 faster than it can drain through opening 65.

If the system is functioning properly when the jet stream is thus submerged, the resulting reduction of pressure in chamber 56 permits valve 53 to move upward to close passage 54 whereupon pressure builds up in chamber 43 for closing valve member 41. Closing of the latter may be detected by increase of pressure at gauge 70 to pump pressure. In this way filling of the tank T to level L is simulated by filling the receptacle 64.

When precheck valve 69 is then released so as to permit spring 72 to close the same, flow through conduit 68 is cut off and the contents of receptacle 64 will be drained through the opening 65. Valve 53 may then be manually operated again for initiating flow for filling the tank, as already described.

In the actual tank filling operation, as the level of the liquid introduced into the tank T rises to the level L, the liquid will flow into the receptacle 64 through the opening 65 or over the top of 64 if the level is rising extremely fast to submerge the jet stream so that the pressure head in the receiver circuit 61 will decrease to discontinue the filling operation by closing of the main inlet valve member 41. It is to be noted that the receptable 64 constitutes a shield to guard the jet stream from inadvertent submersion by waves or sloshing of the liquid in the tank T. Drain collector can 67 is provided for those instances in which it is desired to avoid dripping of fuel from drain opening 65 to the surface of the fuel in the main tank when the latter is not full, pipe 110 carrying the drainage fuel to the bottom of the tank.

The arrangement of FIG. 2 may, for example, be used in connection with a tank truck which is adapted to be filled at a loading station. With this arrangement, tank T is, of course, mounted on the truck, as are all of the components of the system shown in FIG. 2 with the exception of supply line 47. The latter is part of the loading station installation and may be connected to valve assembly 40, which is mounted on the truck, by any suitable coupling means.

FIG. 3 illustrates an arrangement in which the automatic shutoff valve is part of the loading station installation. This simplifies the installation on the truck itself and requires fewer automatic shutoff valves. In the FIG. 2 arrangement a separate automatic shutoff valve assembly 40 is needed for each truck since it is carried by the truck.

In the FIG. 3 arrangement, the installation at the loading station includes supply line 47 connected to valve assembly 40. Valve 40 is connected by means of conduit 74 to a fueling nozzle 90 having a manually controlled valve 91 therein and which is adapted to be connected to an adaptor valve 92 having a spring seated valve member 93 therein. Nozzle 90 and adaptor valve 92 may, for example, be of the type shown in Davies Patent 2,519,358.

Leading from discharge port 54 of starting valve 52 is a line 94 which connects to downstream port 73 of main valve 40. Another line 95 connects to line 74 and has a quick disconnect coupling part 96 thereon adapted to be coupled with another quick disconnect coupling part 97. Each of the coupling parts has a valve element therein which automatically closes when the coupling parts are separated and opens when the parts are brought together. Such quick disconnect couplings are well known in the art and, for example, may be of the type shown in Patent 2,850,297.

Chamber 56 of pilot valve 52 is connected by line 101 to part 99 of another quick disconnect coupling which is adapted to connect and disconnect from another part 100, these disconnect coupling parts being identical to coupling parts 96, 97, the coupling parts being so arranged that 96 cannot be inadvertently connected to part 100 nor part 99 to part 97.

The installation on the tank truck includes adaptor valve 92 which connects by way of conduit 103 to the interior of tank T. Quick disconnect coupling part 97 connects by means of conduit 105 with jet nozzle 59 within container 64 and opposite jet receiver 63 which in turn is connected to quick disconnect coupling part 100 by conduit 106.

Branching from conduit 105 is another conduit 68 in which is mounted precheck valve 69. Conduit 68 at its upper end connects to the interior of container 64.

Opening and closing of valve 40 in FIG. 3 is accomplished in the same manner as described in connection with FIG. 2. However, in this instance back pressure valve 81 is omitted because fueling nozzle 90, adaptor 92, and the additional length of line 74 provide enough pressure drop to maintain enough pressure in inlet port 46 for providing sufficient pressure in the jet circuit for maintaining pilot valve member 53 in open position.

When it is desired to fill the tank, fuel nozzle 90 is connected to tank adaptor 92, quick disconnect coupling parts 96 and 97 are connected, and similarly quick connect coupling parts 99 and 100 are connected. Nozzle valve 91 is then opened by means of nozzle handle 104, and the pump (not shown) for supplying line 47 is turned on. Pilot valve 53 is then pulled outwardly to connect passage 50 with passage 54, and in this instance, fluid from chamber 43 may pass orifice 44 and valve member 41 will open to feed fuel into the tank. As before, the jet stream from nozzle 59 creates a pressure in the receiver circuit and within chamber 56 for holding pilot valve 53 open. When the jet stream from jet nozzle 59 becomes submerged by the liquid rising within the tank, the jet is dissipated and the pressure within chamber 56 drops to permit pilot valve 53 to close and thus cause closing of main valve 41 in the manner previously described.

In FIG. 3, line 68 for precheck valve 69 is connected to line 105 instead of main valve inlet 46 as shown in FIG 2, to avoid furnishing an additional quick disconnect joint.

Precheck valve 69 may be operated in the same manner as described in connection with FIG. 2 for pre-checking the operability of the system.

When the tank is full and valve 40 has closed, fuel nozzle valve 91 may be closed by means of handle 104 and fuel nozzle 90 disconnected from adaptor valve 92. Upon closing of nozzle valve 91 adaptor valve 92 closes by spring pressure to prevent draining of any fluid from the tank. Coupling parts 96 and 99 are then disconnected from parts 97 and 100, respectively, and the tank truck may be removed from the station.

In the event it is desired to fill a tank truck which is not fitted with a sensor jet system 62, a line 112 with a manually controlled on-off valve 113 therein may connect line 95 with line 101 as shown in FIG. 4, the parts being preferably installed with valve 113 located near the top of the tank truck so that the operator, after opening valve 113 and pilot valve 53 to initiate flow, can observe filling from the top of the truck and actuate valve 113 to stop further filling. Valve 113, when open, permits back pressure in line 95 to operate in chamber 56 for maintaining pilot valve 53 open. When valve 113 is then closed, pressure is cut off from chamber 56 and spring 57 closes pilot valve 53 and consequently valve member 41 also.

Other modes of applying the principle of the invention may be employed, change being made as regards the details described, provided the features stated in any of the following claims, or the equivalent of such, be employed.

I therefore particularly point out and distinctly claim as my invention:

1. In combination, an automatic shutoff valve for controlling the level to which a tank may be filled, said valve having an inlet connectible to a source of liquid supply and an outlet for connection to the tank, a valve member for controlling flow of liquid between the inlet and outlet, said valve member having a first side exposed to pressure of liquid in said inlet and an opposite side of larger area than said first side, a restricted passage for conducting liquid from said inlet to said opposite side, a bleed port leading from said opposite side and having a flow capacity greater than said restricted passage, a pilot valve for opening and closing said bleed port and hence said valve member, a jet nozzle in said tank, means including a first conduit for conducting liquid under pressure to said jet nozzle when said pilot valve is open, a jet receiver in position for receiving a jet stream of liquid issuing from said nozzle for generating a pressure in said jet receiver, means including a second conduit for directing pressure in said jet receiver to said pilot valve for holding said pilot valve open, said jet stream being exposed to the rising level of liquid entering the tank and when submerged being incapable of pressurizing said jet receiver, and means for automatically closing said pilot valve and hence said shutoff valve when the pressure in said jet receiver falls below a predetermined minimum.

2. The combination of claim 1 in which there is a bypass conduit connecting said first and second conduits whereby liquid from said first conduit may be communicated directly to said second conduit for pressurizing said pilot valve for holding the same in open position.

3. The combination of claim 2 in which there is a valve in the first conduit between the bypass and the jet nozzle for closing said first conduit, a valve in the second conduit between the bypass and jet receiver for closing the second conduit, and a valve in the bypass conduit for opening and closing the same.

4. In combination, an automatic shutoff valve for controlling the level to which a tank may be filled, said valve having an inlet connectible to a source of liquid supply and an outlet for connection to the tank, a valve member for controlling flow liquid between the inlet and outlet, said valve member having a first side exposed to pressure of liquid in said inlet and an opposite side of larger area than said first side, a restricted passage for conducting liquid from said inlet to said opposite side, a bleed port leading from said opposite side to a jet nozzle located in said tank, a pilot valve for opening and closing the bleed port for causing opening and closing of said valve member, a jet receiver in position for receiving a jet stream of liquid issuing from said jet nozzle when said pilot valve is open for generating a pressure in said jet receiver, means for directing pressure in said jet receiver to said pilot valve for holding said pilot valve in open position, said jet stream being exposed to the rising level of liquid entering the tank and when submerged being incapable of pressurizing the jet receiver, and means for automatically closing said pilot valve and hence said valve member when the pressure in said jet receiver falls below a predetermined minimum.

5. The combination of claim 4 in which said bleed port has a branch downstream of said pilot valve and connected to the outlet side of said shutoff valve, and a back pressure regulator valve in said branch, said regulator valve being openable by pressure of fluid in said branch when the pressure in said bleed port is sufficient for developing said predetermined minimum pressure in said jet receiver.

6. In combination, an automatic shutoff valve for controlling the level to which a tank may be filled, said valve having an inlet connectible to a source of liquid supply and an outlet for connection to the tank, a valve member for controlling flow of fluid between the inlet and outlet, said valve member having a first side exposed to pressure of fluid in said inlet and an opposite side of larger area than said first side, a restricted passage through said valve member for conducting fluid from said inlet to said opposite side, a bleed port leading from said opposite side to the downstream side of said valve, a conduit open to the downstream side of the valve and leading to a jet nozzle within said tank, a pilot valve for opening and closing the bleed port for causing opening and closing of said valve member, a jet receiver in position for receiving a jet stream of liquid issuing from said jet nozzle for generating a pressure in said jet receiver, means for directing pressure in said jet receiver to a portion of said pilot valve for holding said pilot valve in open position, means for developing sufficient pressure downstream of said shutoff valve to cause flow of a jet stream of liquid from said jet nozzle, said jet stream being exposed to the rising level of liquid entering the tank and when submerged being incapable of pressurizing said jet receiver, and means for automatically closing said pilot valve and hence said shutoff valve when the pressure in said jet receiver falls below a predetermined minimum.

7. In combination, an automatic shutoff valve for controlling the flow of liquid into a tank, said valve having a fluid pressure operated valve member movable to positions for opening and closing a passage through the valve, a jet nozzle from which liquid may flow in a jet stream to a jet receiver for generating a pressure therein, means associated with said valve member for causing said valve member to close in response to the pressure in said jet receiver means dropping below a predetermined value, and a pilot valve operatively connected to said valve member for initiating flow of liquid from said valve member to said jet nozzle, said jet receiver means being operatively connected to said pilot valve to subject said pilot valve to sufficient pressure to maintain the same in open position.

8. The combination of claim 7 in which there is a means acting in opposition to the pressure directed against said pilot valve by said jet receiver means for closing said pilot valve when the pressure in said jet receiver means falls below said predetermined value.

9. The combination of claim 7 in which said pilot valve is manually operable to open position for initiating flow to said jet nozzle and is manually closable at will.

10. In combination, an automatic shutoff valve for controlling the flow of liquid into a tank, said valve having a fluid pressure operated valve member movable to positions for opening and closing a passage through the valve, a jet nozzle from which liquid may flow in a jet stream to a jet receiver for generating a pressure therein, means associated with said valve member for causing said valve member to close in response to the pressure in said jet receiver dropping below a predetermined value, a pilot valve operatively connected to said valve member for initiating flow of liquid from said valve member to said jet nozzle, and a precheck means independent of said pilot valve which is operable at will for causing pressure in the jet receiver to fall below said predetermined minimum value.

11. The combination of claim 10 in which said precheck means includes a container surrounding said jet nozzle and also includes a valve controlled conduit means operative to direct liquid to said container to fill said container and thus submerge said jet stream to prevent the latter from pressurizing said jet receiver.

12. The combination of claim 11 in which said container is located within the tank near the top thereof and has a drain opening, said drain opening being of less flow capacity than said valve controlled conduit means, and there is a drain collector for receiving liquid draining from said drain opening and conducting it to a point near the bottom of the tank.

13. In combination, an automatic shutoff valve for controlling the flow of liquid into a tank, said valve having a fluid pressure operated valve member movable to positions for opening and closing a passage through the valve, a jet nozzle from which liquid may flow in a jet stream to a jet receiver for generating a pressure therein, means associated with said valve member for causing said valve member to close in response to the pressure in said jet receiver dropping below a predetermined value, a pilot valve associated with said valve member for initiating flow of liquid to said jet nozzle, said jet nozzle being connected to the shutoff valve downstream thereof whereby the pressure in the jet nozzle is dependent upon the pressure drop across said shutoff valve when the latter is open, and means operatively connected to said valve member for creating a back pressure therein tending to maintain said valve member in the closed position, thereby increasing said pressure drop when said shutoff valve is open for establishing a predetermined minimum pressure in said jet nozzle.

14. The combination of claim 13 in which said pressure drop increasing means includes a valve means operable by fluid pressure, said valve means being operative to cause said shutoff valve to remain closed until sufficient pressure in said passage upstream of said shutoff valve is reached to establish such increased pressure drop when said shutoff valve is open as aforesaid.

15. In combination, an automatic shutoff valve for controlling the flow of liquid into a tank, said valve having a fluid pressure operated valve member movable to positions for opening and closing a passage through the valve, a jet nozzle from which liquid may flow in a jet stream to a jet receiver for generating a pressure therein, means associated with said valve member for causing said valve member to close in response to the pressure in said jet receiver dropping below a predetermined value, a pilot valve operatively connected to said valve member for initiating flow of liquid from said valve member to said jet nozzle, said shutoff valve and pilot valve being part of a liquid supply installation, and said jet nozzle, jet receiver, and tank being part of a mobile liquid receiving installation; first, second, and third conduits for respectively connecting said shutoff valve to said tank, said jet nozzle to a source of liquid, and said jet receiver to said pilot valve, portions of each of said conduits being part of the liquid supply installation and other portions of each of said conduits being part of said mobile installation, and a quick connect means for connecting the respective portions.

16. In combination, an automatic shutoff valve for controlling the flow of liquid into a tank, said valve having a fluid pressure operated valve member movable to positions for opening and closing a passage through the valve, a jet nozzle from which liquid may flow in a jet stream to a jet receiver for generating a pressure therein, means associated with said valve member for causing said valve member to close in response to the pressure in said jet receiver dropping below a predetermined value, a pilot valve operatively connected to said valve member for initiating flow of liquid from said valve member to said jet nozzle, a pressure operated means for venting said tank, and means for automatically opening said pressure operated means to vent said tank whenever said valve member is opened.

17. In combination, an automatic shutoff valve for controlling the flow of liquid into a tank, said valve having a fluid pressure operated valve member movable to positions for opening and closing a passage through the valve, a jet nozzle from which liquid may flow in a jet stream to a jet receiver for generating a pressure therein, means associated with said valve member for causing said valve member to close in response to the pressure in said jet receiver dropping below a predetermined value, a pilot valve operatively connected to said valve member for initiating flow of liquid from said valve member to said jet nozzle, and a means independent of the pressure in the jet receiver for moving the valve member to open position for draining the tank.

References Cited by the Examiner

UNITED STATES PATENTS

| | | | |
|---|---|---|---|
| 2,796,090 | 6/1957 | Carriol | 141—198 |
| 2,903,025 | 9/1959 | Richards | 137—386 X |
| 3,011,686 | 12/1961 | Rockwell | 222—397 |
| 3,174,503 | 3/1965 | Absolon | 137—393 |

FOREIGN PATENTS 313,524   6/1956   Switzerland.

WILLIAM F. O'DEA, *Primary Examiner.*

LAVERNE D. GEIGER, MARTIN P. SCHWADRON,
*Examiners.*

D. DONOVAN, D. MATTHEWS, *Assistant Examiners.*